Patented Feb. 1, 1944

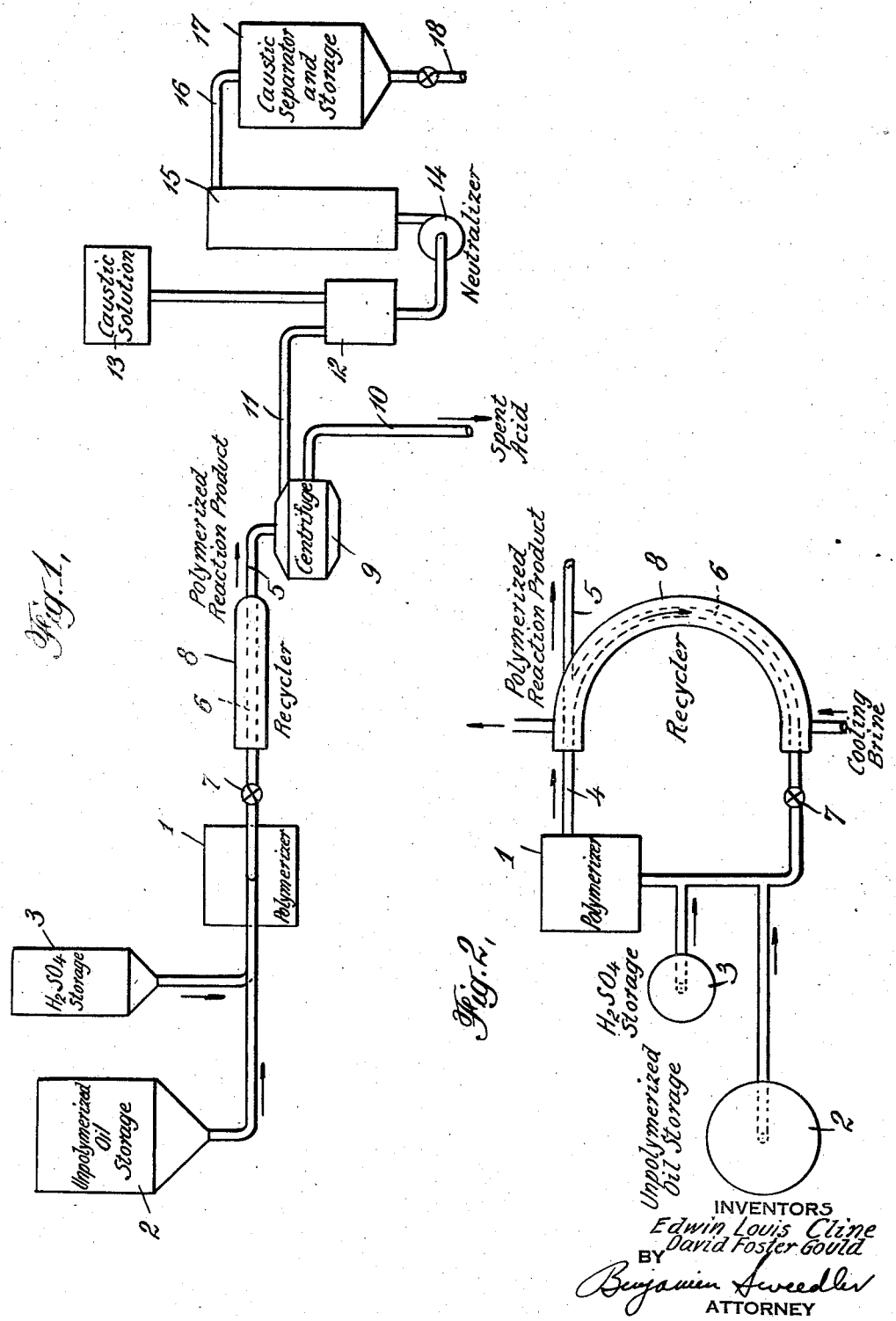

2,340,413

UNITED STATES PATENT OFFICE 2,340,413

METHOD FOR PRODUCTION OF COUMARONE-INDENE TYPE RESINS

Edwin L. Cline, Philadelphia, Pa., and David F. Gould, Riverton, N. J., assignors, by mesne assignments, to Allied Chemical & Dye Corporation, a corporation of New York Application July 12, 1941, Serial No. 402,142

7 Claims. (Cl. 260—81)

This invention relates to a process and apparatus for production of a coumarone-indene type resin by rapid continuous polymerization of a resin oil.

In the polymerization of coumarone-indene crudes for the production of resins it is considered of industrial advantage to carry out the polymerization in a rapid continuous manner. In the means heretofore provided, however, for continuous polymerization, the resins produced have not been of satisfactorily high quality. The increasing use of these resins for the compounding of special coating materials and related products of carefully controlled characteristics has made it increasingly important that these resins should meet strict specifications. Two of the important specifications imposed on these resins relate to melting point and vegetable oil solubility. The resins heretofore produced by continuous polymerization have often possessed an undesirably low melting point, and when an effort has been made to improve their melting point, the resins produced by rapid continuous polymerization methods have been characterized by extremely poor solubility in vegetable oils.

It is an object of this invention to provide a new method and apparatus for carrying out rapid continuous polymerization of coumarone-indene resin oils whereby resins of improved physical qualities, particularly improved solubility in vegetable oils, may be obtained.

We have discovered that high-quality coumarone-indene type resins, and particularly resins of high solubility in vegetable oils, are obtained in continuous catalytic polymerization of a coumarone-indene resin oil when a controlled proportion of the polymerization reaction product is diverted and mixed with the unpolymerized oil and catalyst entering the polymerization reaction zone. We have further found, in accordance with our invention, that the above-described improved resin product may be obtained by carrying out the polymerization in an apparatus comprising a polymerizer where intimate contact between the crude and the catalyst is established in a rapid continuous manner, provided with a branched outlet which includes a return duct for diverting and returning a controlled proportion of the effluent reaction mixture back into the polymerizer, the return duct having means for introduction of fresh unpolymerized oil and fresh catalyst near the point where recycled material is reintroduced into the polymerizer. Another feature of our apparatus is the provision of a cooling jacket surrounding the recycling duct, and a further feature is the means by which the proportion of effluent returning to the polymerizer is controlled.

In the accompanying drawing,

Figure 1 is an elevation view of a preferred embodiment of our invention, illustrating, in flow-diagram form, a preferred process for carrying out our invention, and including, in diagrammatic form, a preferred embodiment of the apparatus of our invention, and Figure 2 is a plan view of a part of Figure 1, illustrating in greater detail the recycling method and apparatus of Figure 1.

The process of our application is applicable for the production of coumarone-indene type resins from coumarone-indene crudes in general derived from the usual sources for this type of crude, i. e., coke-oven operations, water-gas operations and petroleum cracking and reforming operations; particularly from coumarone-indene fractions boiling within the range about 150° to 205° C. obtained from such sources as coke-oven light oil, drip oil, distillates from coke-oven tar, and particularly crudes containing indene as the predominating polymerizable component. Resin oils of this type generally contain such polymerizable constituents as coumarone, indene, styrene, styrene homologs, and similar polymerizables, in varying amounts, indene and styrene homologs usually predominating. We have found it particularly advantageous to employ an oil containing less than 30% polymerizable material for the polymerization process of our invention. Such an oil may be obtained by the blending or dilution of a more concentrated crude, for example, by addition to the crude of a refined naphtha containing little or no polymerizable material. In practicing the process of our invention a coumarone-indene crude, for example, a naphtha of coke-oven or drip-oil origin, may first be subjected to purification treatments such as distillation or chemical treatments or both, depending on the source and purity of the crude.

In carrying out the polymerization process of our invention, the temperature of the resin oil feed may be as high as 40° C., but is preferably in the range —25° to —5° C. We have found it particularly advantageous to use a precooled resin oil as feed; i. e., to maintain the resin oil feed temperature in the range —25° to —15° C.

Polymerization of resin-forming constituents in the oil is brought about by mixing a catalyst such as sulfuric acid or metallic halide with the oil, and agitating the mixture to bring about intimate contact of oil and catalyst, for example, by forming a fine dispersion of sulfuric acid catalyst in the oil or effecting dissolution of stannic chloride catalyst in the oil. The preferred catalyst for use in our process is sulfuric acid. The preferred concentration of the sulfuric acid catalyst is in the range about 78% to 100% sulfuric acid, particularly about 93% sulfuric acid (66° Bé.), and 1% to 2% of the acid, based on the volume of the oil, is preferably employed.

In our preferred process the mixture of oil and catalyst is subjected to continuous polymerization, the polymerizer effluent is divided into two streams, one of which is withdrawn as polymerizer output, and fresh unpolymerized oil and catalyst are continuously fed into the other stream of polymerizer effluent, which is being returned to the polymerizer. The volume ratio of recirculated material to unpolymerized oil feed is preferably in the range 5:1 to 60:1, particularly 25:1 to 50:1; this ratio may be maintained by suitably controlling the rate of feed of catalyst and oil to the polymerization zone or by controlling the rate of recirculation of the polymerized oil, or by both of the aforesaid expedients. In a preferred method the unpolymerized oil feed is introduced into the recycled material at an earlier point than the catalyst, and the two oil streams are thoroughly mixed before the introduction of fresh catalyst.

In the polymerizer, the stream of oil and catalyst is subjected to sufficient agitation to dissolve the catalyst or disperse it throughout the oil in the form of fine droplets. When the catalyst is finely dispersed, polymerization takes place rapidly throughout the body of oil at the greatly increased interface surfaces. The agitation of the oil and catalyst to bring about dissolution or dispersion is accomplished in a rapid and continuous manner by passing the mixture through such apparatus as a colloid mill, a centrifugal pump, or other equipment capable of dispersing sulfuric acid in a resin oil. Polymerization of resin-forming constituents of the oil feed, we have found, may thus be brought about during the time of travel from the point of entrance of oil feed into the polymerizer to the point of division of polymerizer effluent into output and recycled material. We consider it preferable, in the process of our invention, to limit this polymerization time to less than one minute, and preferably to less than ten seconds. In other words, the space velocity through the polymerization zone (i. e. the volume rate of flow of material through the polymerization zone divided by the volume of the polymerization zone) should preferably be greater than one reciprocal minute, and it is particularly advantageous to employ a space velocity greater than six reciprocal minutes.

The portion of the polymerized product not diverted for recycling is treated to separate catalyst, for example by centrifuging, settling, distillation or washing. Sulfuric acid catalyst, for example, may be separated by centrifuging the portion of polymerizer effluent withdrawn as output, or by quenching in water and settling to separate the oil from the water. The separated oil is then washed with a caustic solution, for example 10% sodium hydroxide solution, to neutralize residual acid, the caustic wash solution is separated, and the polymerized oil treated for recovery of the resin product in the usual manner, e. g., by distillation.

The process of our invention makes possible the rapid, efficient production of coumarone-indene resins of surprisingly high quality; i. e., light color, high-melting point and high solubility in vegetable oils. Our method and apparatus involving recycling of a portion of the polymerized material is also advantageous in its flexibility with respect to controlling the properties of the resin product, e. g., the melting point and solubility of the resin; that is, the properties of the product by means of our recycling method and apparatus may easily and quickly be controlled to a desired value by simple regulation of the recirculation ratio and rate of flow of materials. As indicated above, resins to be employed in various special coating compositions must meet stringent specifications. For example, resins which are to be blended with various vegetable materials must have a high vegetable oil solubility and at the same time must have a satisfactory melting point; our recycling method and apparatus makes it possible, by simple regulation of recirculation ratio, to produce a resin of high vegetable oil solubility without permitting the melting point of the resin to fall to an unsatisfactorily low value. Moreover, the recycling of a portion of the polymerized material permits closer control of process variables; for example, polymerization temperature may be controlled by cooling the recycled material. Thus the combination of rapid continuous polymerization and controlled recirculation, with all its attendant advantages, provides a commercially attractive process for producing resins of unusually favorable properties. Resins of particularly high quality may be produced when the resin oils are pre-cooled to low temperatures prior to polymerization.

In the drawing, reference numeral 1 indicates a polymerizer capable of bringing about intimate contact between a resin oil, acid catalyst and recycled oil in a rapid and continuous manner. The polymerizer may, for example, be a colloid mill or a centrifugal pump; a Charlotte colloid mill with clearance between rotor and stator set at .015 inch has been found advantageous. Reference numeral 2 indicates an unpolymerized oil storage tank which may be provided with a cooling arrangement for pre-cooling the oil; 3 indicates a sulfuric acid catalyst storage tank. Regulated amounts of the unpolymerized oil and fresh catalyst acid are fed into the recirculated material entering polymerizer 1. The polymerization reaction product withdrawn at 4 is divided into the two streams 5 and 6. The stream 6 is the portion of the polymerization product recycled to the polymerizer. The proportion of polymerization reaction product diverted through branch 6 is controlled by valve 7; additional regulatory means (not shown), for controlling the flow of material, may be included in the conduit 5 through which reaction product is withdrawn from the polymerizer system. The jacket 8, through which cooling brine may be circulated, surrounds the branch passage 6. The reaction product withdrawn from the system through pipe 5 is fed to centrifuge 9 where the spent acid is separated and discharged through 10. Instead of a centrifuge, a settling tank may be used for the separation of spent acid. The separated oil passes through duct 11 to the mixing tank 12 of the neutralizer where it is treated with caustic solution from the tank 13. The oil and caustic solution are pumped by centrifugal pump 14 into the tower 15, where the washing of the oil with the caustic solution is completed. The mixture of oil and wash solution is passed through pipe 16 to tank 17 where the caustic solution is separated through discharge pipe 18. The polymerized oil thus obtained may be treated to recover the resin product.

The following examples are illustrative of the process of our invention:

*Example 1.*—A crude "Hi-Flash" naphtha fraction (boiling range 170° to 182° C.) containing 70% of polymerizable material was diluted with part-refined "Hi-Flash" to form a mixture containing 26% of polymerizable material. The mixture was pre-cooled to −27° C. The pre-cooled resin oil was fed to a polymerization apparatus, consisting of a Charlotte colloid mill with clearance between rotor and stator set at .015 inch, at the rate of 0.9 liter per minute; 66° Bé. (93%) sulfuric acid was supplied at the rate of 0.018 liter per minute. There was thus 2% of the 66° Bé. sulfuric acid, based on the volume of the oil, in the reaction mixture. The colloid mill was connected to a jacketed recycling tube provided with side arm pipes for feeding the resin oil and sulfuric acid catalyst as shown on the drawing. The control valve (shown as 7 on the drawing) was opened wide to give a volume ratio of 54 to 1 for the rate of recycling to rate of feed of fresh resin oil. Polymerized oil effluent withdrawn for recovery of resin had a temperature of 7° to 10° C. as it left the polymerizer. This effluent was quenched continuously with water, settled to separate water and spent acid, and the oil neutralized and worked up for resin in the customary manner.

The resulting resin had a melting point of 140° C. and a vegetable oil cloud point of −20° C. indicated by first appearance of a cloud when a solution of the resin in rapeseed oil was chilled in accordance with the standard procedure for determining vegetable oil solubility, hereinafter described.

*Example 2.*—The same oil as in Example 1 was treated by the procedure described in that example, except that the oil was pre-cooled to a temperature of −15° C. instead of −27° C. The temperature of the effluent leaving the polymerizer in this case was 9° to 12° C.

The resin recovered from the reaction product had a melting point of 138° C., and a solution of the resin in rapeseed oil when tested according to the standard procedure showed a first cloud at −20° C.

*Example 3.*—The procedure of Example 1 was carried out except that the rate of feed of fresh oil and catalyst was doubled, i. e., increased to 1.8 liters per minute for the fresh oil and 0.036 liter per minute for the acid catalyst. The volume ratio of recycled oil to fresh oil was thus 27 to 1, instead of 54 to 1. The effluent leaving the polymerizer had a temperature of 9° to 13° C.

The resin recovered from this reaction product had a melting point of 145° C. and a cloud point in rapeseed oil of −10° C.

*Example 4.*—A resin oil as in Example 1 was maintained at 30° C., fed to the polymerizer at a rate of 3.6 liters per minute, and sufficient 100% sulfuric acid was fed to maintain the proportion of catalyst at 2% of 100% acid based on the volume of the oil. The volume ratio of recycled oil to fresh oil was 13 to 1. The oil effluent from the polymerizer had a temperature of 1° to 2° C.

The resin recovered from this reaction product had a melting point of 123° C., a good vegetable oil solubility, and a color of C-1¼.

*Example 5.*—A resin oil as in Example 1 containing 26% polymerizables was fed to the polymerizer at the rate of 6 liters per minute. 100% sulfuric acid was fed at a corresponding rate so as to maintain a proportion of 2% catalyst based on the volume of the oil. The volume ratio of recycled oil to fresh oil in this run was 7 to 1. The oil feed had a temperature of 30° C. and the effluent from the polymerizer had a temperature of 3° to 4° C.

The resin recovered from this reaction mixture had a melting point of 120° C., a good vegetable oil solubility, and a color of C-1¼. Thus it is seen that even with a recycling ratio as low as 7, a resin of high quality is produced.

*Example 6.*—A resin oil and sulfuric acid were fed to a polymerizer as in Example 1 and the recycling valve was set to give a volume ratio of recycled oil to fresh oil of 8 to 1. The oil feed was pre-cooled to a temperature of −15° C. and the effluent from the polymerizer was at a temperature of 6° to 12° C.

The resin recovered from this reaction mixture had a melting point of 153° C. and the cloud point of a rapeseed oil solution was 32° C. It is noted the vegetable oil solubility of this product, though satisfactory, was somewhat lower than in previous runs, due to the fact that a relatively low recycling ratio was used in this run. The melting point of the resin product, however, was very satisfactory and the vegetable oil solubility was much better than would have been the case without recycling.

For purposes of comparison with Examples 1, 2, 3 and 6, involving pre-cooling of the resin oil and use of 66° Bé. acid, a run was made with the recycling valve closed so that the ratio of recycled oil to fresh oil was zero. A resin oil as in Example 1, containing 26% polymerizables, was pre-cooled to −20° C., fed to the polymerizer, without recycling, at a rate of 3.6 liters per minute, and sufficient 66° Bé. acid was added to maintain the proportion of catalyst at 1½% based on the volume of the oil. The resin recovered in this case had a rapeseed oil cloud point of 72° C., and a melting point of 171° C.

It is noted from the above comparison that when the volume ratio of recycled oil to fresh oil is high, as in Examples 1, 2 and 3, the resin product has an unusual combination of properties, namely adequately high melting point and extremely good solubility in vegetable oils. It is further noted that even when the volume ratio of recycled oil to fresh oil is relatively low, as in Example 6, the vegetable oil solubility is still good, i. e., a rapeseed cloud of 32° C. as compared to 72° C. when no recycling is employed, and the melting point is quite satisfactory.

*Example 7.*—The following run was made with an unusually small amount of catalyst. A resin oil as in Example 1 was fed to the polymerizer at the rate of 1.2 liters per minute and 66° Bé. sulfuric acid was fed at a rate sufficient to maintain a proportion of 1.25% catalyst based on the volume of the oil. The recycling ratio was maintained at 40. The temperature of the feed oil was 30° C. and the temperature of the effluent from the polymerizer was −2° to −1° C.

The resin recovered from this reaction mixture had a melting point of 118° C. and a solution of the resin in rapeseed oil showed a slight cloud at −20° C.

*Example 8.*—The following run was made using a resin oil having a polymerizable content outside the preferred range. A resin oil blended as described in Example 1 so as to bring the concentration of polymerizables to 36% was fed to the polymerizer at the rate of 1.2 liters per minute and 66° Bé. sulfuric acid was fed at such a rate as to maintain the proportion of catalyst at 2% based on the volume of the oil. The recycling ratio was maintained at 40. The temperature of the oil feed was 30° C. and the temperature of the effluent from the polymerizer was 4° to 19° C.

The resin recovered from this reaction product had a melting point of 107° C., good solubility in vegetable oil, and a color of C-½+. In spite of the high polymerizable content and high temperature of the resin oil feed, a resin product of satisfactory quality for many purposes was obtained because the polymerization reaction mixture was recycled in accordance with our invention.

The standard test for vegetable oil solubility referred to above is carried out as follows: 17.7 grams of resin and 18.2 grams of rapeseed oil are heated and held at a temperature of 140° to 150° C. until a clear solution is obtained. This solution is poured into a 20 x 175 mm. test tube to a depth of 6 cm. The solution is cooled to room temperature, the time noted, and after standing for one hour at room temperature the presence or absence of cloudiness in the solution is noted. If the solution remains clear, it is thereupon cooled to +10° C., kept at this temperature for one hour and again examined for cloudiness. This procedure is repeated for the temperatures 0° C., −10° C. and −20° C. successively. The test is carried through in continuous fashion without delay or deviation from the specified periods of time.

The color of the resin according to the standard resin color scale referred to above is determined as follows: The resin scale is determined by mixing three stock solutions in the proportions indicated in the following table, thereby obtaining the colors indicated in this table; namely, stock solution "A" constituted of 40 cc. of 33.5% hydrochloric acid and 1560 cc. of water; stock solution "B" made by triturating 450 grams of C. P. ferric chloride ($FeCl_3.6H_2O$), 270 cc. of solution "A" and filtering, using the clear filtrate for stock solution "B"; and stock solution "C" made by triturating 60 grams of C. P. cobalt chloride ($CoCl_2.6H_2O$) and 60 cc. of solution "A" and filtering, using the filtrate for stock solution "C."

*Volumes in cubic centimeters*

| Color number | "A" | "B" | "C" | Water | Standard "C" series |
|---|---|---|---|---|---|
| C-⅛ | 18 | | | | 6 of #½ |
| C-¼ | 12 | | | | 12 of #½ |
| C-⅜ | 6 | | | | 18 of #½ |
| C-½ | 125 | 0.5 | 0.50 | | |
| C-¾ | | | | | 12 of #½+12 of #1 |
| C-1 | 125 | 1.0 | 0.75 | | |
| C-1¼ | | | | | 12 of #1+12 of #1½ |
| C-1½ | 125 | 1.4 | 0.95 | | |
| C-2 | 125 | 2.0 | 1.25 | | |
| C-2½ | 125 | 2.8 | 1.60 | | |
| C-3 | 125 | 4.0 | 2.00 | | |
| C-3½ | 15 | 6.0 | 2.00 | 110 | |
| C-4 | 15 | 8.0 | 2.00 | 110 | |
| C-5 | 15 | 10.0 | 2.75 | 85 | |
| C-6 | 10 | 20.0 | 5.00 | 90 | |
| C-7 | | 40.0 | 7.50 | 100 | |
| C-8 | | 65.0 | 5.00 | 50 | |
| C-9 | | 125.0 | 10.00 | 27.5 | |
| C-10 | | 125.0 | 10.00 | | |

The solutions should be mixed well and about 25–28 cc. of each of the above indicated mixtures placed in a 1 oz. test bottle, each bottle labeled with its number, and the bottle sealed with sealing wax to prevent evaporation of water and HCl.

To determine the color of a resin, a 2-gram sample thereof is dissolved in 25 cc. of benzol and the depth of the color of the resin solution thus produced is compared with the standard colors. If the sample lies between two consecutive numbers, its color is reported as the higher one.

Since certain changes in carrying out the above process and in the construction set forth, which embody the invention, may be made without departing from its scope, it is intended that all matter contained in the above description or shown in the accompanying drawing shall be interpreted as illustrative and not in a limiting sense.

What is claimed is:

1. In a process for the production of high quality coumarone-indene type resins by continuous catalytic polymerization of a coumarone-indene resin oil, the step which comprises recycling a controlled proportion of the polymerization reaction product back to the polymerization reaction zone.

2. In a process for the production of high quality coumarone-indene type resins, the steps which comprise subjecting a coumarone-indene resin oil to continuously catalytic polymerization, continuously withdrawing polymerization reaction product from the polymerization reaction zone, diverting a controlled proportion of the withdrawn product, and continuously mixing the diverted material with the entering unpolymerized resin oil.

3. In a process for the production of high quality coumarone-indene type resins by rapid continuous catalytic polymerization of a coumarone-indene resin oil, the steps which comprise diverting such a proportion of the polymerization reaction product for return to the polymerization reaction zone that the volume ratio of recycled oil to entering unpolymerized oil is in the range 5:1 to 60:1, and mixing the diverted oil with the entering unpolymerized oil and entering fresh catalyst.

4. In a process for the production of high quality coumarone-indene type resins by rapid continuous catalytic polymerization of a coumarone-indene resin oil containing less than 30% of polymerizable constituents, the steps which comprise diverting such a proportion of the polymerization reaction product for return to the polymerization reaction zone that the volume ratio of recycled oil to entering unpolymerized oil is in the range 25:1 to 50:1, mixing the diverted oil with the entering unpolymerized oil, thereafter mixing entering sulfuric acid catalyst with the oil mixture, and passing the resulting mixture into and through the polymerization reaction zone at a space velocity greater than one reciprocal minute.

5. In a process for the production of high quality coumarone-indene type resins, the steps which comprise subjecting a coumarone-indene resin oil to rapid continuous catalytic polymerization, diverting a controlled proportion of the polymerization reaction product, and mixing it with entering unpolymerized resin oil maintained at a temperature in the range −25° to −5° C.

6. A process for the production of coumarone-indene type resins which comprises continuously feeding a coumarone-indene resin oil at a temperature not higher than about 40° C. to a polymerization reaction zone, continuously feeding about 1% to 2%, based on the volume of the resin oil, of about 78% to 100% sulfuric acid to said reaction zone, continuously passing the resin oil and the sulfuric acid through a polymerization reaction zone at a space velocity greater than one reciprocal minute to disperse the acid in the oil and bring about polymerization of polymerizable constituents of the oil, continuously withdrawing the polymerization reaction product from the reaction zone, dividing the reaction product into two portions, continuously returning one of these portions to the polymerization reaction zone at a rate such that the volume ratio of recycled oil to entering unpolymerized oil is in the range 5:1 to 60:1, and continuously treating the other portion of the withdrawn reacted mixture to recover a resin product.

7. A process for the production of coumarone-indene type resins which comprises continuously feeding a coumarone-indene resin oil at a temperature in the range about −25° to −15° C. to a polymerization reaction zone, continuously feeding about 1% to 2%, based on the volume of the resin oil, of about 78% to 100% sulfuric acid to said reaction zone, continuously passing the resin oil and the sulfuric acid through a polymerization reaction zone at a space velocity greater than six reciprocal minutes to disperse the acid in the oil and bring about polymerization of polymerizable constituents of the oil, continuously withdrawing the polymerization reaction product from the reaction zone, dividing the reaction product into two portions, continuously cooling one of these portions and returning it to the polymerization reaction zone at a rate such that the volume ratio of recycled oil to entering unpolymerized oil is in the range 25:1 to 50:1, and continuously treating the other portion of the withdrawn reaction mixture to separate acid therefrom, neutralize the oil and recover a resin product.

EDWIN L. CLINE.
DAVID F. GOULD.